Patented July 11, 1939

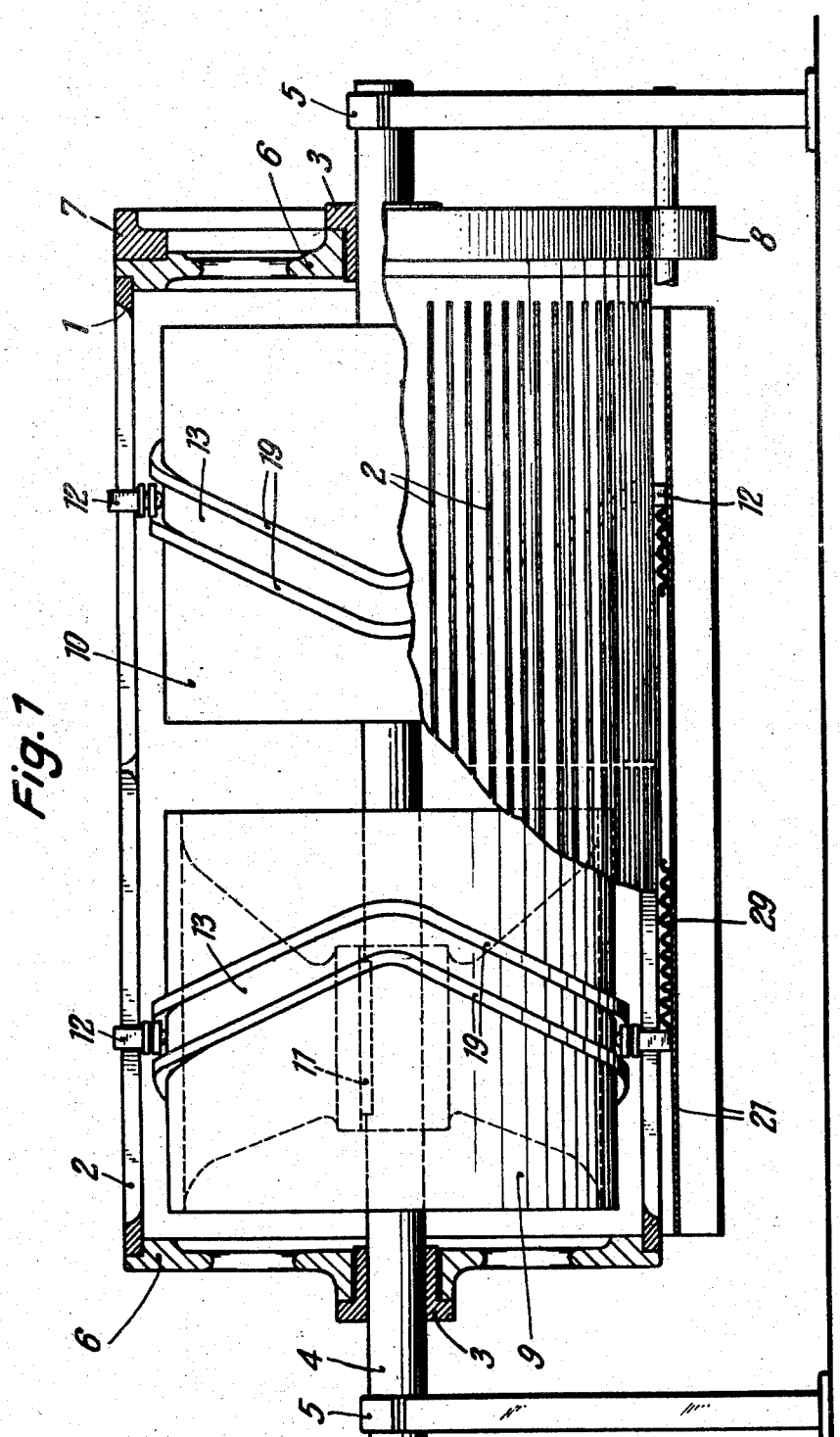

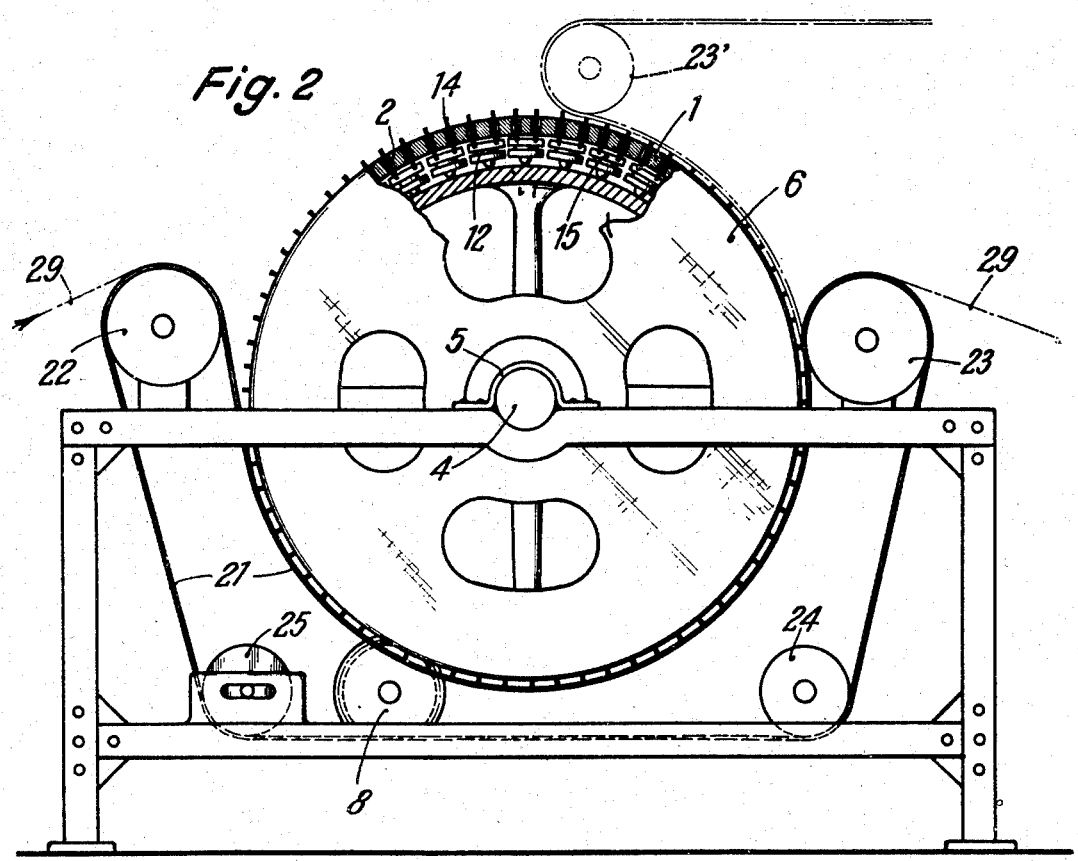
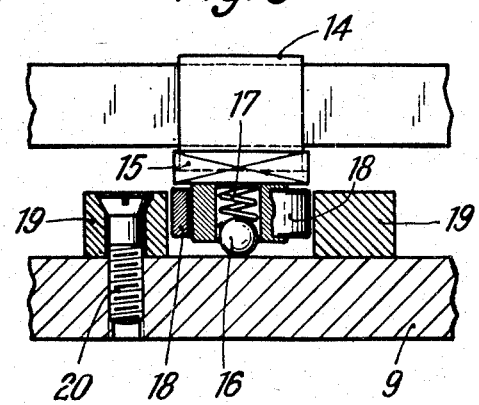
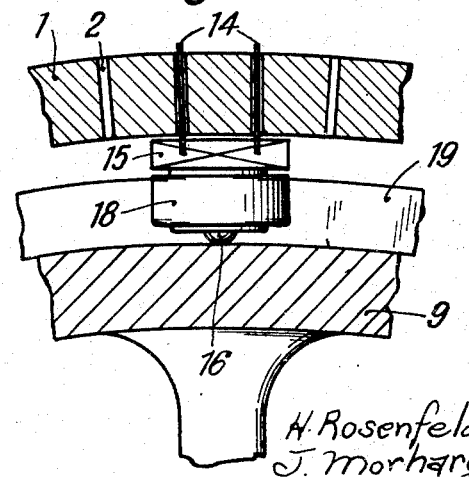

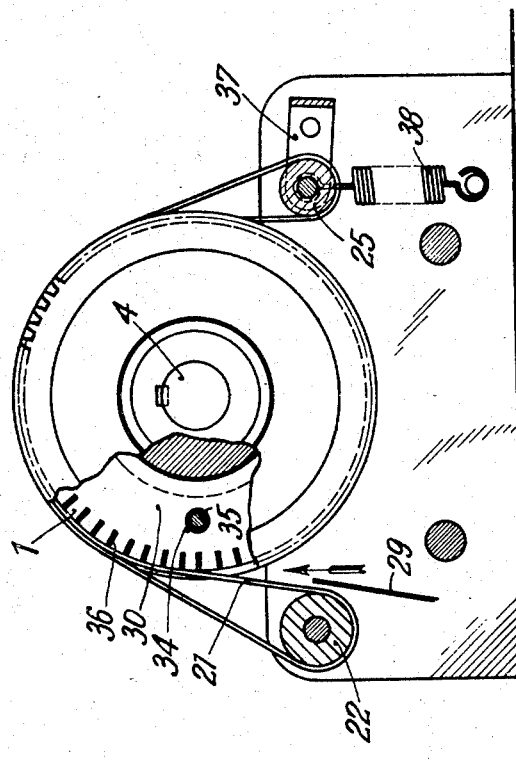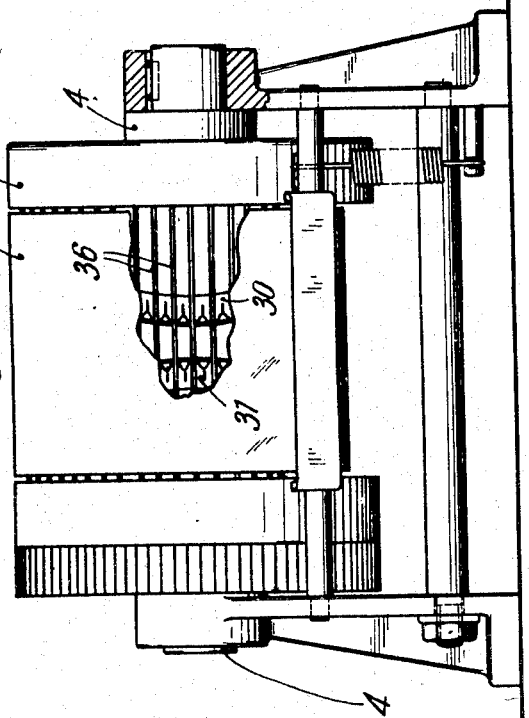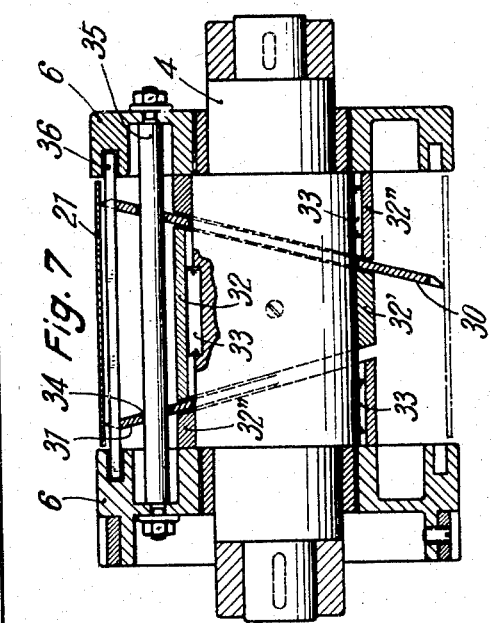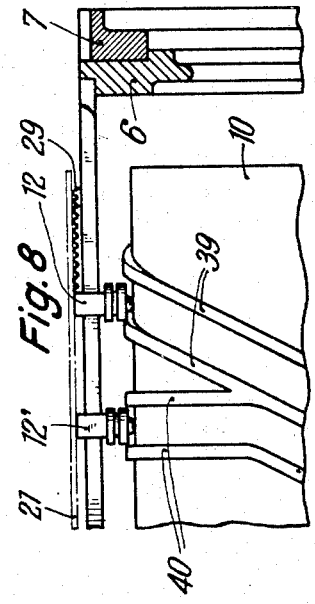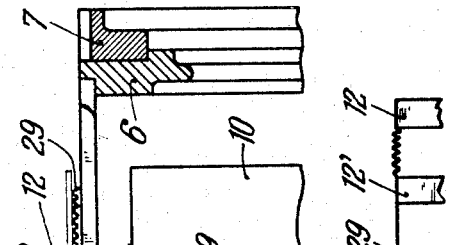

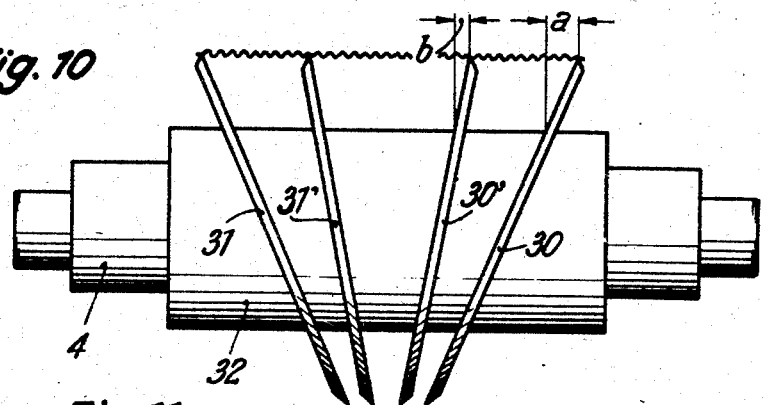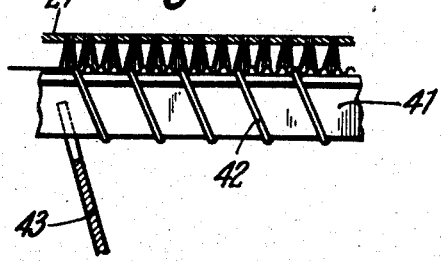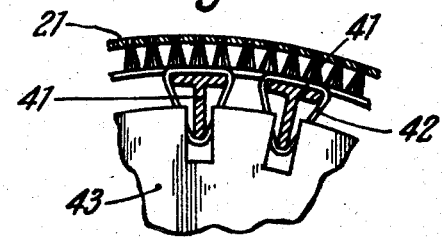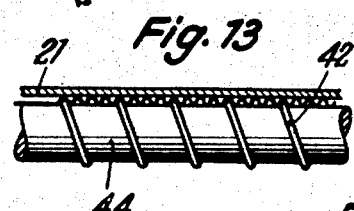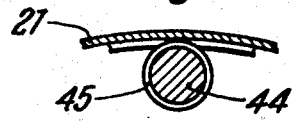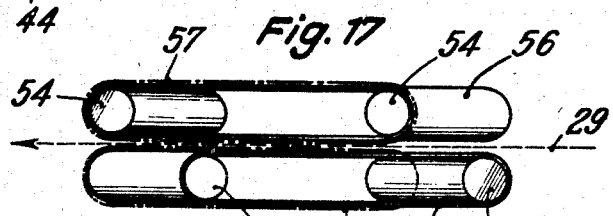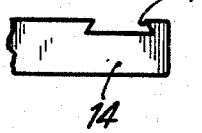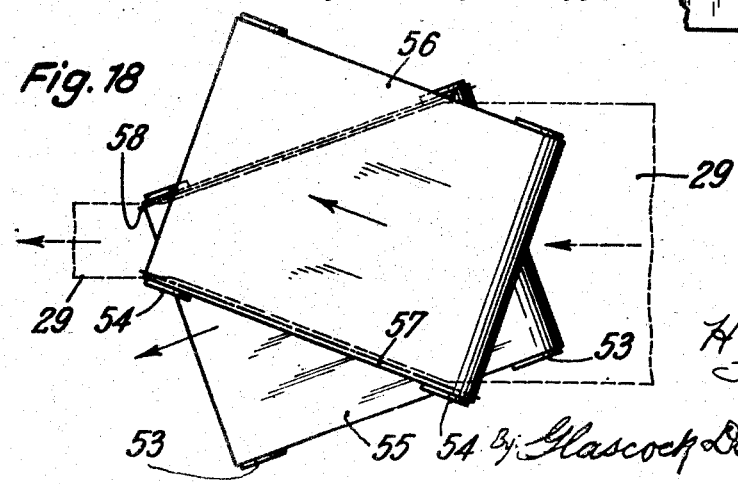

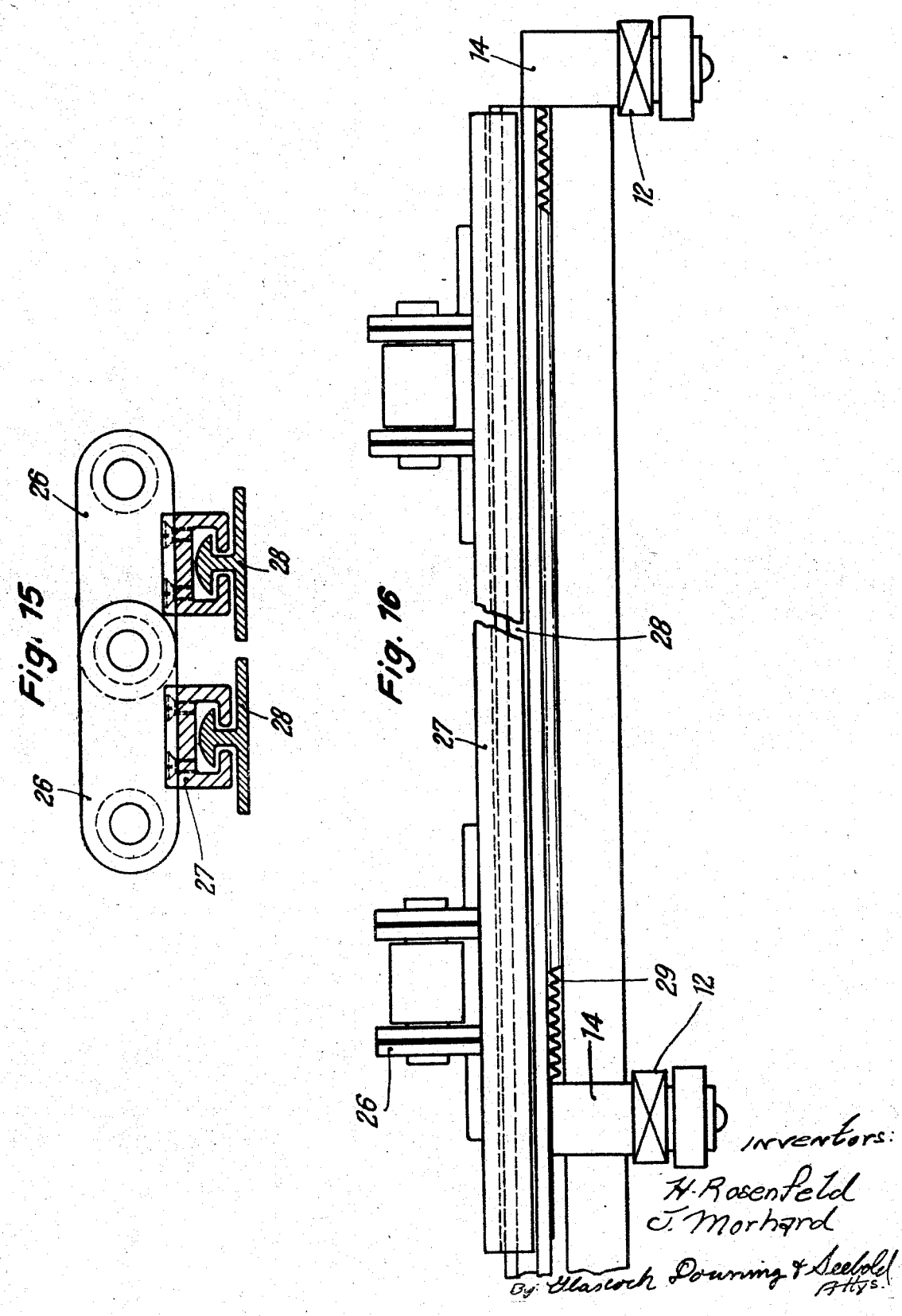

2,165,728

UNITED STATES PATENT OFFICE 2,165,728

APPARATUS FOR CREPING SHEET MATERIAL

Hermann Rosenfeld and Josef Morhard, Mannheim, Germany

Application March 30, 1936, Serial No. 71,788
In Germany April 1, 1935

12 Claims. (Cl. 154—30)

The present invention relates to apparatus for producing creped or crinkled sheet material.

A method is already known for producing longitudinally creped or crinkled material, by compressing the web of material transversely to its longitudinal direction. The compression of the web is effected progressively or step by step in such manner that starting from the edge or from the middle of the web one or more folds are produced one after the other consecutively.

The object of the present invention is to provide an arrangement for carrying out a creping or crinkling method whereby it is possible to crinkle or crepe travelling web of paper, metal foil, fabric or other sheet material by mechanical means. This result is attained in that creping or crinkling tools are arranged on one or both sides of the web along an inclined inwardly directed line, the tools travelling forwardly in the direction of motion of the web which is to be crinkled. In such a manner the web is gradually compressed or crumpled, it being possible for the web also to extend laterally beyond the creping tools. The individual folds or groups of folds thus obtained extend gradually over the entire width of the paper web. The creping tools may consist either of individual elements or may be constituted by a travelling band.

The arrangement may be such that provided between the two guides for the web which is to be crinkled are two or more rows of abutments serving as creping tools, which abutments move forwardly together with one or both guides and at the same time move towards one another, whereby they gradually compress the web which is to be crinkled.

It is thus an essential feature of the invention that the creping tools move in the forward direction together with the web which is to be crinkled. Thus the web can run continuously, for example at the normal working speed of a paper machine. At the same time the inward motion of the tools produces the crinkling or creping without excessive load on the material by the creping operation.

The conveyor for the web which is to be creped may be a travelling grid-like surface behind which individual creping tools in the form of slide members, for example, are movably arranged on angular guides in such manner that their operative portions project through the slots in the grid-like conveyor. Thus in the movement of the conveyor the tools are carried along at the same speed as the conveyor, and as a result of the angular positioned guides are simultaneously displaced inwardly.

A number of rows of simultaneously operative tools can be arranged transversely to the web, the outmost tools being guided inwardly at a larger angle in their forward motion in the direction of travel than the tools which are on the inside. The web which is to be creped is thus displaced towards the centre or to one side. In a manner which will be explained more fully below with respect to a plurality of tools operating simultaneously on the web there is sufficient material available for the formation of folds so as to avoid tearing the web. Preferably the conveyor for the web which is to be creped consists of a continuous surface, such as a driven hollow cylinder. The peripheral surface of the cylinder is provided with slots parallel to the axis or the drum may be built from individual elements with gaps left between them. The creping tools are then accommodated in the interior of the conveyor cylinder, on an internal cylinder arranged concentrically with the outer cylinder. The guides for the creping tools are then so shaped that during one rotation of the conveyor cylinder these tools move inwardly up to a predetermined point and then are restored to their initial position again.

Frequently it is necessary for the creped web or parts thereof to be extended laterally after the compression. According to a further feature of the invention, a separate drawing device is provided which draws out to a prescribed width the compressed portions of the web. This drawing device may, for example, comprise web engaging devices arranged along both sides of the creped web. In a manner similar to the creping tools these devices move forwardly and outwardly simultaneously, whereby they stretch the crinkled web. A series of such devices can be provided transversely to the web.

The invention will be explained in greater detail with reference to the accompanying drawings.

Fig 1 is a side view showing in part a central section of a creping device in accordance with the invention with a hollow cylinder as the conveyor.

Fig. 2 is an end view of the arrangement shown in Fig. 1, with the cylinder partly broken away.

Fig. 3 is a side view on an enlarged scale showing a portion of the drum surfaces including a creping tool.

Fig. 4 is an end view of the parts shown in Fig. 3.

Fig. 5 shows a second embodiment of the creping device in side view, the creping cylinder being partly broken away.

Fig. 6 is an end view of the apparatus shown in Fig. 5.

Fig. 7 is a horizontal sectional view through the arrangement shown in Fig. 5.

Fig. 8 is a view showing the essential portion of a creping device in which a plurality of crinkling tools engage a web simultaneously along a transverse line.

Fig. 9 illustrates diagrammatically the condition of the web during the operation of an arrangement according to Fig. 8.

Fig. 10 shows diagrammatically a further embodiment of creping device in which a number of tools operate simultaneously along a transverse line.

Figs. 11, 12, 13 and 14, respectively, show in side elevation and section further embodiments of crinkling devices.

Fig. 15 is a fragmentary sectional view showing a construction of the counter-surface to the conveyor.

Fig. 16 is a side view of the arrangement according to Fig. 15 showing a particular position of the creping tools.

Fig. 17 shows diagrammatically in side elevation a further embodiment of a creping device.

Fig. 18 is a top plan view of the apparatus shown in Fig. 17.

Fig. 19 shows a construction of creping tool which is also suitable for use in a drawing device.

Figure 20:
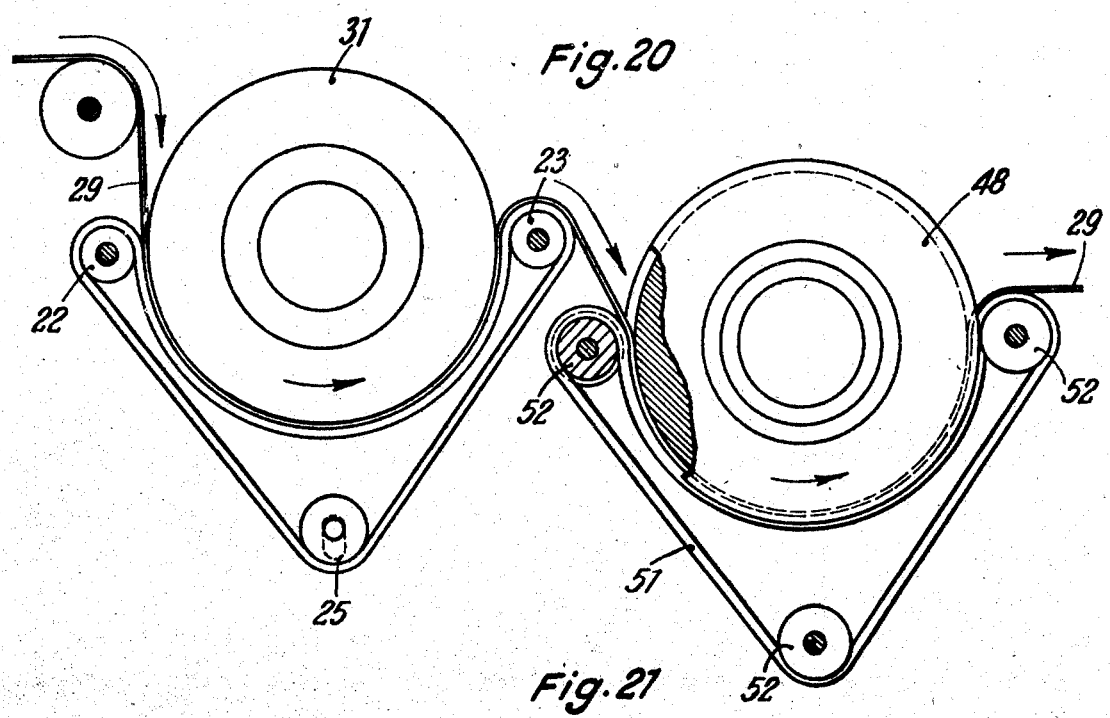

Fig. 20 is an end view of a creping device followed by a drawing device.

Figure 21:
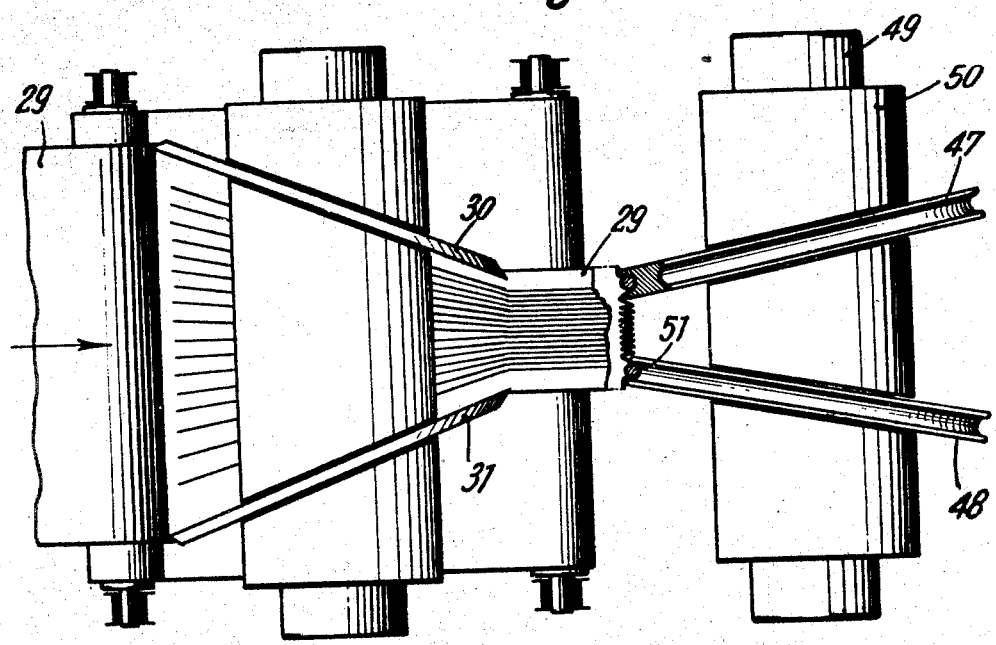

Fig. 21 is a top plan view of the apparatus illustrated in Fig. 20.

The corrugating device shown in Figs. 1 to 4 comprises a hollow cylinder 1, the entire peripheral surface of which is provided with slots 2 extending in the axial direction and preferably uniformly spaced in a circumferential relation. Instead of employing a cylinder with slotted peripheral surface use may be made of a cylinder built up from individual elements of suitable construction. By means of bearings 3 the cylinder 1 is rotatably mounted on a stationary hollow shaft 4. This hollow shaft is supported by a framework to which it is secured by means of bearing straps 5. End pieces 6 are attached to the surface of the cylinder. On one of these two end surfaces is secured a gear wheel 7 by means of which the cylinder 1 is driven by means of a pinion 8. Any other suitable driving means may be employed in place of the driving mechanism described above. Disposed within the hollow cylinder 1 are two stationary inner cylinders 9 and 10 which can of course be replaced by a single cylinder. These inner cylinders are secured on the stationary hollow shaft 4 by means of keys 11, and serve to carry the corrugating tools 12 as well as the guideways 13 therefor. As clearly seen from Figs. 3 and 4 these crinkling tools consist of one or more slide elements 14 which are carried by a support 15. This support 15 rests on one or more balls 16 which are accommodated in a recess in the part 15, and are urged outwardly by means of a spring 17. Also provided on the outside of the element 15 is a ring 18. The creping tools can be mounted in any other appropriate manner instead of in the manner here described. It is only of importance that the creping tools should be capable of moving in their guides with the smallest possible friction. Moreover the slide members 14 may have a different form from that illustrated. The guideways 13 for the slide members 14 consist of two cam rings 19 which are secured on the inner cylinders 9 and 10 by means of screws 20 or the like. The shape of the guideways 13 is clearly shown in Fig. 1. The guideways approach one another up to a certain point and then extend away from one another. The creping tools 12 are positioned between the two guides 19 on each cylinder and are distributed over the circumference thereof. The edges of the slide members 14 project through the slots 2 in the peripheral surface of the rotating cylinder 1.

As shown in Fig. 2 a band 21 extends round approximately half the periphery of the cylinder 1 and is guided by means of rollers 22, 23, 24 and 25. Preferably at least one of the guide rollers, e. g., the roller 25 is adjustably mounted to enable the tension of the band 21 to be regulated. This band may be smooth or ribbed and can consist, for example, of metal, felt, leather, Celluloid or the like. If desired bands carrying bristles may be employed as shown in Figures 11 and 12. Moreover a profiled band can be employed as described in connection with Figs. 15 and 16. In the construction shown in these figures two or more chains 26 are provided, the individual links carrying a profile 27. These members 27 carry displaceable slats 28 which are disposed parallel to the axis of the cylinder so that a slat band like a roller blind is obtained.

The arrangement of the guideways 13 for the creping tools is such that the tools move towards one another along that part of the periphery of the cylinder which is embraced by the band 21 and move away from one another on the remaining part of the cylinder.

The manner in which the creping or crinkling is effected is as follows:

The web which is to be creped, if desired, may be submitted to a suitable pre-treatment. A paper web 29 thus treated and moistened or coated with bitumen or the like, travels in the direction indicated by the arrows in Fig. 2. The web is introduced beneath the creping tools 12 between the cylinder 1 and the guide band 21. At the point of introduction the tools 12 are approximately in that position at which they are most widely separated. This position must of course correspond at least to the initial width of the web. The web is then carried along between the periphery of the cylinder and the band 21. At the same time the creping tools 12 which pass through the slots 2 in the cylinder and are freely displaceable in the guides 19, are carried along by the cylinder at the same speed of rotation. In addition, at the same time the creping tools move inwardly due to their angular guides. Consequently the tools engage the web and in the inward motion of the tools urge the web towards the centre. As one creping tool after the other comes into operation the inward displacement of the web is effected slowly and gradually in a perfectly uniform manner. Moreover, the web is held above and below by the surfaces of the cylinder and the band 21 and since these surfaces are parallel to the plane of the web, it cannot bulge to one side, but is compelled to assume the desired narrow creping. Finally, the creping tools attain their closest position which approximately corresponds to the point at which the band 21 leaves the periphery of the cylinder. At this point the creped band leaves the crinkling device while the creping tools move away from each other during their inoperative travel.

The creping device shown in Figs. 5 to 7 operates on the same principle as the arrangement according to Figs. 1 to 4. It also comprises a rotatably mounted and driven hollow cylinder 1 in the interior of which the crinkling tools are accommodated. In this example, however, there are no individual creping tools but two angularly disposed discs 30 and 31 are provided. For mounting these discs a slotted sleeve 32 which is held against rotation by means of keys 33 is slid on the stationary shaft 4. This sleeve comprises a central portion 32' and lateral portions 32''. First the central portion 32' is positioned, then the discs 30, 31 which are free to rotate on the shaft 4 or with reference to the sleeve 32 and then the outermost elements 32', are placed in position. Provided in the discs are one or more apertures 34 through which cross members 35 extend between the two end pieces 6 of the hollow cylinder 1 so that the discs are caused to rotate with the end members 6. The peripheral surface of the cylinder is constituted by individual bars 36 but as in the example shown in Figs. 1 to 4 it could be made of slotted sheet material. Provided on the periphery of the discs 30 and 31 are working edges corresponding to the members 12 and projecting through the slots in the cylinder 1.

It will be apparent that during rotation of the cylinder 1 the discs 30 and 31 are caused to participate in the rotation by the action of the cross pieces 35 or by the rods 36, and due to the angular setting of the discs the working edges of the discs execute the same movement as the creping tools 12 in Fig. 1. That is to say, the working edges of the discs move progressively from the outer limiting position shown at the top of Fig. 7 into the inner end position shown at the bottom of Fig. 7 and conversely.

Here also the band 21 passes about that part of the periphery of the cylinder at which the working edges of the discs move from the outside towards the inside. The tension of the band can be regulated by means of a roller 25, which is rotatably mounted on a pivoted lever 37 and is subjected to the action of a spring 38. As already explained this band 21 may be constructed in various ways.

The creping operation occurs in the same way as has already been explained with reference to Figs. 1 to 4.

In the embodiments described above two rows of creping tools are provided between which the web to be crinkled is compressed. It is also possible to employ one row of creping tools and to compress the web thereby. Finally it is also possible to provide a plurality of creping tools operating simultaneously along a transverse line and exerting their effect in the same direction. Embodiments in such arrangements are shown in Figs. 8 to 14.

In the embodiment according to Fig. 8 two creping tools 12 and 12' are provided on the inner cylinders, only the cylinder 10 being shown in Fig. 8. The tool 12 is guided by the ribs 39 and the tool 12' by the guides 40 which initially extend in the peripheral direction of the cylinder 10, or parallel to the direction of rotation, whereas the guides 39 extend angularly. After a certain distance the two guideways extend together. In this manner creping between the tools 12 and 12' only is obtained while the part of the web towards the centre remains smooth. Consequently at the moment at which the two guides unite the web has the form shown in Fig. 9. In the further rotation the tool 12' also commences to operate, thus separating somewhat the material between the tools 12 and 12'. In its further motion the tool 12' travels parallel to the tool 12' without exerting a creping action. Naturally a series of such tools 12, 12' can be arranged in a similar way. A step by step performance of the crinkling operation is then obtained.

In the embodiment shown in Fig. 10 a number of discs 30 and 31 are provided which engage along a transverse line the web which is to be creped, the discs being of different inclination. Consequently, after traversing a certain path the disc 30, for example, has compressed the portion $a$ of the web, and the disc 30' the portion $b$ which is smaller than $a$. In this manner the displacement of the web which is to be creped can be commenced simultaneously at a number of points along a transverse line. As a result of the greater travel of the outer disc 30, a supply of material is afforded for the disc 30'. If no provision were made for such a supply of material then the inner disc 30' would tear the material between it and the outer disc 30, or slide inoperatively along the surface of the tension material during its inward motion on continued rotation of the cylinder.

Here again there is fundamentally no limitation in the number of creping tools which can operate simultaneously.

The embodiments shown in Figs. 8 to 10 are particularly suitable for creping very broad webs, as it is frequently difficult to compress them between two rows of operating members engaging from the outside.

Figs. 11 to 14 show other embodiments of the actual creping tools. In these illustrations the outer cylinder is built from elements 41 of T-shaped cross section, but members of any other suitable cross section may be employed. Wound about these members of T-shaped cross section is helix 42 of wire or other suitable material, which is not wound excessively tight. The sections of wire lying on the upper side correspond to the working edges of the creping tools 12. The crinkling operation is effected by a disc 43 or other guide member of the nature of the discs 30 and 31 or a pusher member in association with guides 9 gradually compresses the coils of the helix 42. During this operation the turns of the helix carry the web along with them so that the web is displaced step by step. A particularly fine creping can be obtained in this way. The band 21 is provided with bristles and constitutes the counter member in this arrangement. It would however, be possible to use a band of slats as described in connection with Figs. 15 and 16 instead of a band brush.

In the embodiment shown in Figs. 13 and 14 the helical coil 42 serving as a creping device is wound on a circular member 44 a plurality of which provide the peripheral surface of the cylinder 1. The coils of the helix are compressed by means of sleeves 45 slidable on the circular members 44. In the same way as the creping tools 12 and the discs 30 and 31 these sleeves are moved inwardly from the outside during the crinkling operation, and then revert to their initial position.

Another construction is shown in Fig. 16. Here the slats 28 constituting the band 21 are so arranged that the tools 12 on one side lie beneath the slats 28, whereas on the other side the tools bear against one edge of the slats. The underside of the slats themselves is slightly roughened. As soon as the tools 12 move towards one another during the crinkling operation the tools on one side displace the slats 28 laterally, it being necessary of course to make the conveyor cylinder of corresponding dimensions. Due to this displacement and in consequence of the roughening of the slats 28 a particularly fine creping is obtained.

In the examples described above the surface serving for conveying the web and for controlling the creping tools consists of a cylindrical surface. It is, however, possible to use any other suitable continuous surface in place of a cylinder, e. g. a substantially rectangular form with rounded corners. It is also possible to employ a surface which is discontinuous, for example a plane surface. In the latter case it is advantageous to provide for the creping tools, which can consist of discs or individual slide members, endless guides of such kind that by means of these guides the crinkling tools are moved forwardly and inwardly simultaneously during their working operation, and are restored to their initial position during the idle motion.

Finally it is also not necessary to utilise a conveyor surface provided with slots through which the creping tools project, but a conveyor surface which is not slotted may be provided and the crinkling tools could execute on the surface thereof the same movements as those hereinbefore described.

In the construction shown in Figs. 17 and 18 two guide surfaces 55 and 56 passing over rollers 53 and 54 are provided, the band 29 which is to be creped being passed between them. Rigidly connected with each guided surface is a row of creping tools 57 or 58 which participate in the motion of the guides. These tools may consist of individual pusher members or may be a continuous strip. The precise form of the creping tools is not fundamental to the invention, and it is also not of particular significance whether the crinkles remain within the creping tools or not.

The directions of motion of the two guides 55 and 56 are inclined at an angle such that the two rows of tools 57 and 58 move towards one another so that the web is compressed in the same way as in the creping devices previously described.

Instead of providing two rows of creping tools it would also be possible to provide a plurality of rows which, for example, may co-operate in the manner described with reference to Fig. 10. Moreover, instead of rigidly connecting the tools with the guide aprons 55 and 56 it would be possible to allow them to project through slots in these aprons, so that they would participate in the motion thereof, or a separate drive can be provided for the creping tools. In this particular instance no difficulty is involved in providing the separate drive, as the creping tools move in a direction parallel to the direction of travel of the associated guide apron.

Naturally the creping tools and their guides can be constructed in various ways differing from the constructions described and illustrated. The essential thing is that there should be a forward movement in common with the web which is to be crinkled with a simultaneous inward movement which effects the creping. Moreover, it is not essential that the counter-band should travel along with the web or that it should be constructed in the manner indicated, but individual rollers or bands could be employed, and these individual bands or rollers could, if desired, be arranged along a line which is directed obliquely inwardly. It is also possible to operate without a counter-band by providing the paper or other web with a thick layer of adhesive, e. g., bitumen, on its underside.

In some circumstances it is advantageous to effect a transverse creping of the band also, either before, during, or after the longitudinal crinkling. For this purpose the individual machine elements are advantageously associated in compact form in such manner that a single moistening operation is sufficient both for the longitudinal and transverse creping. It is also possible by a retardation during the longitudinal creping process to obtain a compacting in the other direction also, so that both operations can be performed in one aggregate It has been found that in practice to obtain good results to fold the crepings very tightly and then to loosen them somewhat, e. g. to compact the creped web more than the desired final width and then to draw it out again to the desired final width.

A drawing device suitable for this purpose can be provided in a simple manner, in that in the creping device shown in Figs. 1 and 2, the guide roller 23 for the counter-band 21 is disposed at the point shown in dotted lines, i. e., at a point at which the creping tools 12 have moved outwardly somewhat from their narrowest position and to an amount corresponding to the desired final width of the corrugated web. Moreover, provided on the operative elements 14 of the corrugating tools are hook portions 46 of some appropriate kind as indicated in Fig. 19, these elements being adapted to engage the web 29 and to carry it along with them.

Consequently the web 29 after reaching its smallest width at approximately the level of the guide roller 23 shown in full line position, Fig. 2, is extended laterally by the outwardly moving creping tools and then passes out of the machine over the roller 23' to provide the desired final width.

The drawing or extending device could of course be utilised in a similar way in conjunction with the corrugating device shown in Figs. 5 and 6.

It is also possible to provide a separate drawing device which operates on the web as it leaves the corrugating device as illustrated in Figs. 20 and 21. In the example shown this drawing device consists of two disc-like pulleys 47 and 48 which by means of a slotted sleeve 50 are mounted so as to be freely rotatable in an inclined position on the shaft 49. The sleeve 50 corresponds to the sleeve 32 of Fig. 7. A cord 51 of suitable material is directed around approximately half the periphery of each pulley by means of guide rollers 52, as clearly shown in Fig. 20. The compactly creped web emerging from the crinkling device is introduced between the pulleys 47, 48 and the cords 51. The edges of the creped web are held by the resultant clamping action and accordingly the web is extended to an amount determined by the angular setting of the disc-like pulleys 47 and 48. The web 29 finally leaves the drawing or extending device with the desired width.

Preferably the angular setting of the pulleys 47 and 48 is made variable in order to provide the desired width of the web 29. As a rule it is not necessary to provide separate driving means for the pulleys 47 and 48 as the forward movement of the creped web is sufficient. However, it is of course possible to provide means for driving the guide pulleys if necessary.

The construction of the drawing or extending device is not limited to the examples given but may be carried out in various ways. The only essential point is that elements are provided either in the form of individual tools or in the form of endless bands which engage the creped web, and while moving forwardly with the web at substantially the same speed as the web also move outwardly. Thus the movement is essentially the converse to that in the actual creping device. Here, as in the crinkling device, individual members which come into operation in succession may be utilised or the web which is to be extended laterally may be engaged along a moving line by the devices as is the case in the construction of Figs. 20 and 21.

In the same way as the creping device the drawing or extending device is not restricted to the cylindrical form, but any other continuous surface could be employed or a plane surface on which the crinkled web is extended laterally. Thus, for example, the arrangement according to Figs. 17 and 18 could be utilised in the opposite sense.

The creped paper may be subsequently embossed with longitudinal lines. If, for example, longitudinal and transverse undulations are embossed in a doubly creped paper, then a kind of waffle paper is obtained.

It is also pointed out that the drawing or extending device which has been described can be used not only in conjunction with the creping devices as described and illustrated, but can also be employed with crinkling devices of other form as well as with other machines in which it is also necessary to extend a travelling web to a pre-determined extent.

We claim:

1. Apparatus for longitudinally creping a travelling web of sheet material capable of being crimped comprising, a movable conveyor, means for feeding the web into engagement with said conveyor, means for moving the conveyor so that the web is continuously moved forward, rigid means carried by said conveyor adapted to engage one edge of said web, other rigid means carried by said conveyor adapted to engage the other edge of said web, means for maintaining said web between said rigid means, at least one of said rigid means being movable laterally relative to the conveyor and inward with respect to the direction of the movement of said web as the conveyor moves forward whereby the lateral extent of the web is gradually reduced and the sheet material crimped.

2. Apparatus for longitudinally creping a travelling web of sheet material capable of being crimped comprising, a movable conveyor, means for feeding the web into surface engagement with said conveyor, means for moving the conveyor so that the web is continuously moved forward, rigid means carried by said conveyor adapted to engage one edge of said web, other rigid means carried by said conveyor adapted to engage the other edge of said web, means for maintaining said web in surface engagement with said conveyor between said rigid means, the web engaging portions of said rigid means being movable relative to the conveyor towards each other as the web moves forward whereby the lateral extent of the web is gradually reduced and the sheet material crimped.

3. Apparatus for longitudinally creping a travelling web of sheet material capable of being crimped comprising, a movable conveyor, means for feeding the web into engagement with said conveyor, means for moving the conveyor so that the web is continuously moved forward, rigid means associated with said conveyor and movable laterally with respect thereto, said rigid means adapted to engage one edge of said web, other rigid means associated with said conveyor and movable laterally with respect thereto, said last mentioned means adapted to engage the other edge of said web, means for maintaining said web in flat engagement with said conveyor between the web engaging portion of said means, the web engaging portions of said rigid means being movable toward each other as the conveyor moves forward whereby the lateral extent of the web is gradually reduced and the sheet material crimped.

4. Apparatus for longitudinally creping a travelling web of sheet material capable of being crimped comprising, a rotatable cylinder, means for feeding to web to and around a portion of said cylinder so that the web is moved forward by rotation of the cylinder, a plurality of tools carried by said cylinder adapted to engage one edge of the web, rigid means carried by the cylinder for engaging the opposite edge of said web, means for maintaining the web in engagement with the periphery of said cylinder between said tools and said rigid means, stationary guide means associated with said cylinder for moving each of said tools progressively towards the opposite edge of the web as the cylinder rotates whereby the lateral extent of the web is gradually reduced and the sheet material crimped.

5. Apparatus for longitudinally creping a travelling web of sheet material capable of being crimped comprising, a rotatble cylinder, means for feeding the web to and around a portion of said cylinder so that the web is moved forward by rotation of the cylinder, a plurality of tools carried by said cylinder axially movable with respect thereto, each of said tools being adapted to successively engage one edge of said web, a second group of tools carried by said cylinder and axially movable with respect thereto, each tool of said second mentioned group adapted to successively engage the opposite edge of said web, stationary guide rails arranged adjacent said cylinder for respectively causing each tool of the two groups to progressively move towards each other during a portion of one revolution of said cylinder, means for maintaining the web in engagement with the periphery of said cylinder during said portion of a revolution thereof, whereby the sheet material is crimped, said guide rails thereafter causing the tools of each group to move away from each other.

6. Apparatus for longitudinally creping a travelling web of sheet material capable of being crimped comprising, a rotatable cylinder having circumferentially spaced elongated slots extending radially therethrough, means for feeding the web to and around a portion of said cylinder so that the web is moved forward by the rotation of the cylinder, a creping tool mounted for axial movement within each of said slots, said tools being adapted to successively engage one edge of said web, a creping tool mounted for axial movement within said slots and each of said last mentioned tools being adapted to successively engage the opposite edge of said web, two sets of stationary guide rails mounted within said cylinder, one set of guide rails being associated with the tools engaging one edge of said web and the other set of said guide rails associated with the tools engaging the opposite edge of said web, each set of said guide rails being angularly arranged with respect to the axis of rotation of said cylinder, and a belt for maintaining said web adjacent the peripheral surface of said cylinder whereby the creping tools are moved towards each other as the cylinder rotates to cause the lateral extent of the web to be gradually reduced and the sheet material crimped.

7. Apparatus for longitudinally creping a travelling web of sheet material capable of being crimped comprising, a slotted rotatable cylinder, means for rotating said cylinder, a pair of disks angularly arranged within said cylinder, the peripheral portion of one of said disks engaging one edge of said web, the peripheral portion of the other of said disks engaging the other edge of said web, means for feeding the web into engagement with the periphery of the cylinder at a point where the distance between the peripheral portions of the angularly disposed disks is the greatest, means for maintaining said web between said disks whereby the web is moved forward by the cylinder and the lateral extent thereof is reduced and crimped by passing between the peripheral portions of the angularly disposed disks.

8. Apparatus for longitudinally creping a traveling web of sheet material capable of being crimped comprising, a slotted rotatable cylinder, means for rotating said cylinder, a pair of disks angularly arranged within said cylinder, teeth carried by the peripheral portion of each disk, the teeth of one of said disks projecting through the slots of said cylinder and engaging one edge of said web, the teeth of the other of said disks extending through the slots of said cylinder and engaging the other edge of said web, means for feeding the web to and around a portion of said cylinder, said means causing the web to engage the peripheral surface of said cylinder at a point where the distance between the teeth of the angularly disposed disks is the greatest, means for maintaining the web between the disks whereby the web is moved forward by the cylinder and the lateral extent of the web is reduced and creped as the same is moved between the angularly disposed disks.

9. Apparatus for longitudinally creping a travelling web of sheet material capable of being crimped comprising, a plurality of bars arranged in a circumferentially spaced relation to form a slotted cylinder, means for rotating said cylinder, a yieldable coil encircling each of said bars, means for feeding the web to and around a portion of said cylinder so as to cause the surface thereof to engage said coils, a plurality of disks angularly arranged within said cylinder, the peripheral portion of one of said disks engaging one end of said coils, the peripheral portion of the other of said disks engaging the other end of said coils, said means for feeding the web to the cylinder being positioned at a point where the distance between the peripheral portions of the angularly disposed disks is the greatest, means for maintaining the web in surface engagement with said coils whereby said coils are successively compressed between the peripheral portions of said angularly disposed disks as the cylinder is rotated to cause the lateral extent of the web to be reduced and the sheet material to be crimped.

10. Apparatus for longitudinally creping a travelling web of sheet material capable of being crimped comprising, a plurality of bars arranged in a circumferentially spaced relation to form a slotted cylinder, means for rotating said cylinder, means for feeding the web to and around a portion of said cylinder, a plurality of means associated with said cylinder extending through the spaces provided between said bars for engaging said web, said last mentioned means moving axially relative to the peripheral surface of said cylinder as the cylinder is rotated, a belt encircling said portion of the cylinder for maintaining said web adjacent the peripheral surface of said cylinder, whereby the lateral extent of said web is reduced by said means moving axially relative to the cylinder as the web moves forward.

11. Apparatus for longitudinally creping a travelling web of sheet material capable of being crinkled comprising, a plurality of bars arranged in a circumferentially spaced relation to form a slotted cylinder, means for rotating said cylinder, means for feeding the web to and around a portion of said cylinder, a plurality of means associated with said cylinder extending through the spaces provided between the bars for engaging said web, said last mentioned means moving axially relative to the peripheral surface of said cylinder and at different rates of speed with respect to the peripheral surface as the cylinder is rotated, a belt encircling said portion of the cylinder for maintaining the web adjacent the peripheral surface thereof whereby the lateral extent of said width is reduced in different degrees by said means moving axially relative to the peripheral surface of the cylinder.

12. Apparatus for longitudinally creping a travelling web of sheet material capable of being crinkled comprising, a movable conveyor, means for feeding the web into engagement with said conveyor, means for moving the conveyor so that the web is continuously moved forward, rigid means adapted to engage an edge of said web while being in engagement with said conveyor, means for maintaining said web on said conveyor, said rigid means being movable laterally relative to the conveyor and inward with respect to the direction of the movement of said web as the conveyor moves forward whereby the lateral extent of the web is gradually reduced and the sheet material crinkled.

HERMANN ROSENFELD.
JOSEF MORHARD.